(12) United States Patent
Raveendran et al.

(10) Patent No.: US 8,674,957 B2
(45) Date of Patent: Mar. 18, 2014

(54) USER INPUT DEVICE FOR WIRELESS BACK CHANNEL

(75) Inventors: Vijayalakshmi R. Raveendran, San Diego, CA (US); Xiaodong Wang, San Diego, CA (US); Fawad Shaukat, San Diego, CA (US); Xiaolong Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 13/364,568

(22) Filed: Feb. 2, 2012

(65) Prior Publication Data

US 2013/0033435 A1 Feb. 7, 2013

Related U.S. Application Data

(60) Provisional application No. 61/439,809, filed on Feb. 4, 2011, provisional application No. 61/579,056, filed on Dec. 22, 2011.

(51) Int. Cl.
*G06F 3/041* (2006.01)

(52) U.S. Cl.
USPC .......................................................... 345/173

(58) Field of Classification Search
CPC ...................................................... G06F 3/041
USPC ......... 345/173, 156–160, 204, 502, 503, 519, 345/520
See application file for complete search history.

(56) References Cited

U.S. PATENT DOCUMENTS

| 4,791,554 A | 12/1988 | Hirota et al. |
| 5,835,723 A | 11/1998 | Andrews et al. |
| 5,925,137 A | 7/1999 | Okanoue et al. |
| 6,049,549 A | 4/2000 | Ganz et al. |
| 6,195,680 B1 | 2/2001 | Goldszmidt et al. |

(Continued)

FOREIGN PATENT DOCUMENTS

| CN | 1596004 A | 3/2005 |
| CN | 1774106 A | 5/2006 |

(Continued)

OTHER PUBLICATIONS

Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.

(Continued)

*Primary Examiner* — Fred Tzeng
(74) *Attorney, Agent, or Firm* — Donald C. Kordich

(57) ABSTRACT

Aspects of this disclosure relate to a method that includes, in an example, sending, by a source device, display data to a sink device for rendering on the sink device. The method also includes receiving, by the source device, an indication of user input at a first display location of a touch-sensitive screen associated with the source device, wherein the user input specifies a modification of at least a portion of the display data rendered at the sink device, wherein the portion of the display data is rendered at a second display location of the sink device. The method also includes, in response to receiving the indication, sending, by the source device, second configuration data to modify the portion of the display data rendered at the second display location based at least in part on a mapping of the first display location to the second display location.

36 Claims, 8 Drawing Sheets

(56) References Cited

U.S. PATENT DOCUMENTS

| | | |
|---|---|---|
| 6,252,889 B1 | 6/2001 | Patki et al. |
| 6,424,626 B1 | 7/2002 | Kidambi et al. |
| 6,515,992 B1 | 2/2003 | Weston et al. |
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 7,035,281 B1 | 4/2006 | Spearman et al. |
| 7,085,420 B2 | 8/2006 | Mehrotra |
| 7,099,629 B1 | 8/2006 | Bender |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,477,659 B1 | 1/2009 | Nee et al. |
| 7,519,470 B2 | 4/2009 | Brasche et al. |
| 7,529,823 B2 | 5/2009 | Trufinescu et al. |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 * | 5/2010 | Sauerwein, Jr. et al. . 235/472.02 |
| 7,716,385 B2 | 5/2010 | Saint-Hilaire et al. |
| 7,719,972 B2 | 5/2010 | Yuan et al. |
| 7,720,096 B2 | 5/2010 | Klemets |
| 7,868,890 B2 | 1/2011 | Ludwin et al. |
| 7,881,315 B2 | 2/2011 | Haveson et al. |
| 7,929,475 B2 | 4/2011 | Simonson et al. |
| 8,001,384 B2 | 8/2011 | Yamamoto et al. |
| 8,102,849 B2 | 1/2012 | Martinez Bauza et al. |
| 8,157,168 B2 * | 4/2012 | Sauerwein, Jr. et al. ...... 235/384 |
| 8,364,201 B1 * | 1/2013 | Fujisaki ..................... 455/556.1 |
| 8,406,961 B2 * | 3/2013 | Pathak et al. .................... 701/48 |
| 8,437,347 B2 | 5/2013 | Casaccia et al. |
| 8,466,870 B2 * | 6/2013 | Cohen et al. .................. 345/156 |
| 8,517,251 B2 * | 8/2013 | Cohen et al. .................. 235/375 |
| 2002/0007494 A1 | 1/2002 | Hodge |
| 2003/0064752 A1 | 4/2003 | Adachi et al. |
| 2003/0110297 A1 | 6/2003 | Tabatabai et al. |
| 2003/0152098 A1 | 8/2003 | Zhu |
| 2003/0225737 A1 | 12/2003 | Mathews |
| 2004/0071169 A1 | 4/2004 | Abe et al. |
| 2004/0103282 A1 | 5/2004 | Meier et al. |
| 2004/0160967 A1 | 8/2004 | Fujita et al. |
| 2004/0214571 A1 | 10/2004 | Hong |
| 2005/0044142 A1 | 2/2005 | Garrec et al. |
| 2005/0060750 A1 | 3/2005 | Oka et al. |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0166241 A1 | 7/2005 | Kim et al. |
| 2005/0176429 A1 | 8/2005 | Lee et al. |
| 2005/0198663 A1 | 9/2005 | Chaney et al. |
| 2005/0266798 A1 | 12/2005 | Moloney et al. |
| 2005/0271072 A1 | 12/2005 | Anderson et al. |
| 2006/0002320 A1 | 1/2006 | Costa-Requena et al. |
| 2006/0013182 A1 | 1/2006 | Balasubramanian et al. |
| 2006/0028398 A1 * | 2/2006 | Willmore ....................... 345/2.3 |
| 2006/0050640 A1 | 3/2006 | Jin et al. |
| 2006/0058003 A1 | 3/2006 | Lee |
| 2006/0069797 A1 | 3/2006 | Abdo et al. |
| 2006/0098593 A1 | 5/2006 | Edvardsen et al. |
| 2006/0101146 A1 | 5/2006 | Wang |
| 2006/0133414 A1 | 6/2006 | Luoma et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0209787 A1 | 9/2006 | Okuda |
| 2006/0218298 A1 | 9/2006 | Knapp et al. |
| 2006/0233191 A1 | 10/2006 | Pirzada et al. |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1 | 12/2006 | Bhattiprolu et al. |
| 2007/0004387 A1 | 1/2007 | Gadamsetty et al. |
| 2007/0008922 A1 | 1/2007 | Abhishek et al. |
| 2007/0022195 A1 | 1/2007 | Kawano et al. |
| 2007/0037600 A1 | 2/2007 | Fukuda |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0171910 A1 | 7/2007 | Kumar |
| 2007/0182728 A1 | 8/2007 | Fujimori |
| 2007/0264988 A1 | 11/2007 | Wilson et al. |
| 2007/0264991 A1 | 11/2007 | Jones et al. |
| 2007/0274400 A1 | 11/2007 | Murai et al. |
| 2007/0292135 A1 | 12/2007 | Guo et al. |
| 2008/0005348 A1 | 1/2008 | Kosiba et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0109763 A1 | 5/2008 | Lee |
| 2008/0129879 A1 | 6/2008 | Shao et al. |
| 2008/0198848 A1 | 8/2008 | Yamagishi |
| 2008/0205394 A1 | 8/2008 | Deshpande et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0089453 A1 | 4/2009 | Bohan et al. |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141692 A1 | 6/2009 | Kasslin et al. |
| 2009/0153737 A1 | 6/2009 | Glen |
| 2009/0162029 A1 | 6/2009 | Glen |
| 2009/0252130 A1 | 10/2009 | Sheth et al. |
| 2010/0027467 A1 | 2/2010 | Wu et al. |
| 2010/0073334 A1 * | 3/2010 | Cohen et al. .................. 345/204 |
| 2010/0118111 A1 | 5/2010 | Gelman et al. |
| 2010/0123826 A1 | 5/2010 | Sagi |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0257450 A1 | 10/2010 | Go et al. |
| 2010/0268426 A1 * | 10/2010 | Pathak et al. .................... 701/48 |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0069745 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |

(56) References Cited

U.S. PATENT DOCUMENTS

| | | |
|---|---|---|
| 2011/0182195 A1 | 7/2011 | Oikawa |
| 2011/0186138 A1* | 8/2011 | Hanna et al. .................. 137/1 |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2012/0036543 A1 | 2/2012 | George et al. |
| 2012/0036549 A1 | 2/2012 | Patel et al. |
| 2012/0044985 A1 | 2/2012 | Tao et al. |
| 2012/0113113 A1 | 5/2012 | Hong |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033496 A1 | 2/2013 | Raveendran et al. |
| 2013/0047189 A1 | 2/2013 | Raveendran et al. |
| 2013/0238702 A1 | 9/2013 | SHETH; Soham V. et al. |
| 2013/0246665 A1 | 9/2013 | LEE; Byung Joo et al. |

FOREIGN PATENT DOCUMENTS

| | | |
|---|---|---|
| CN | 1832481 A | 9/2006 |
| CN | 1983945 A | 6/2007 |
| CN | 101083825 A | 12/2007 |
| EP | 1203080 A2 | 5/2002 |
| EP | 1206080 A1 | 5/2002 |
| EP | 1233326 A2 | 8/2002 |
| EP | 1325591 A1 | 7/2003 |
| EP | 1333373 A1 | 8/2003 |
| EP | 1385336 A1 | 1/2004 |
| EP | 1423778 A2 | 6/2004 |
| EP | 1517228 A2 | 3/2005 |
| EP | 1550264 A1 | 7/2005 |
| EP | 1653678 A2 | 5/2006 |
| EP | 1944946 | 7/2008 |
| EP | 2012461 | 1/2009 |
| EP | 2037683 | 3/2009 |
| EP | 2190202 A1 | 5/2010 |
| GB | 2383920 A | 7/2003 |
| JP | 2000354031 A | 12/2000 |
| JP | 2002165248 A | 6/2002 |
| JP | 2002262341 A | 9/2002 |
| JP | 2003143237 A | 5/2003 |
| JP | 2004054783 A | 2/2004 |
| JP | 2004505531 A | 2/2004 |
| JP | 2004192140 A | 7/2004 |
| JP | 2004274159 A | 9/2004 |
| JP | 2004531916 A | 10/2004 |
| JP | 2005515714 A | 5/2005 |
| JP | 2005142808 A | 6/2005 |
| JP | 2005204016 A | 7/2005 |
| JP | 2006514353 A | 4/2006 |
| JP | 2006254328 A | 9/2006 |
| JP | 2007082070 A | 3/2007 |
| JP | 2007088539 A | 4/2007 |
| JP | 2007508783 A | 4/2007 |
| JP | 2007206644 A | 8/2007 |
| JP | 2007274150 A | 10/2007 |
| JP | 2007282219 A | 10/2007 |
| JP | 2008191929 A | 8/2008 |
| JP | 2008547264 A | 12/2008 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I239179 | 9/2005 |
| TW | 200618653 | 6/2006 |
| WO | 0184291 A1 | 11/2001 |
| WO | 0210942 | 2/2002 |
| WO | 02023825 A1 | 3/2002 |
| WO | 0249314 A2 | 6/2002 |
| WO | 03061240 A1 | 7/2003 |
| WO | WO-03104834 A2 | 12/2003 |
| WO | 2004034646 A1 | 4/2004 |
| WO | WO-2004051962 A1 | 6/2004 |
| WO | WO-2005109781 A1 | 11/2005 |
| WO | 2006135289 A1 | 12/2006 |
| WO | 2007000757 | 1/2007 |
| WO | 2007021269 | 2/2007 |
| WO | WO-2007033049 A2 | 3/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009015322 A2 | 1/2009 |

OTHER PUBLICATIONS

Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.

Brandenburg, et al., AVTCore, RTCP for inter-destination media syncronization, Internet Draft, draft-ietf-avtcore-idms-092.txt, Oct. 31, 2011.

Co-pending U.S. Appl. No. 10/236,657, filed Sep. 6, 2002.

Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.

Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

International Search Report and Written Opinion—PCT/US2012/023848—ISA/EPO—May 15, 2012.

Kwon E., et al., "An idle timeslot reuse scheme for IEEE 802.15.3 high-rate wireless personal area networks" Vehicular Technology Conference, 2005. VTC-2005-FALL. 2005 IEEE 62ND Dallas, TX, USA Sep. 25-28, 2005, Piscataway, NJ, USA, IEEE, Sep. 25, 2005, pp. 715-719, XP010878576, ISBN: 0-7803-9152-7 section 1. Introduction.

McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.

Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol . MCD, No. V1. 1. 1, Dec. 1, 2010, XP014061814, section 5.

Miller B., et al., "Mapping salutation architecture APIs to Bluetooth service discovery layer," Bluetooth White Paper, [Online} pp. 1-25, Jul. 1, 1999, XP002511956.

Mitrea M., et al., "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/VVG11),, No. M16058, Jan. 29, 2009, XP030044655, sections 2 and 3.

MSDN DirectShow, retrieved Nov. 28, 2011 from: http://msdn.microsoft.com/en-us/library/dd375454(VS.85).aspx.

MSDN Windows Sockets 2, retrieved Nov. 28, 2011 from: http://msdn.microsoft.com/en-us/library/ms740673(VS.85).aspx.

(56) References Cited

OTHER PUBLICATIONS

Myers, et al: "Collaboration Using Multiple PDASs Connected to a PC," Proceedings of the ACM Conference on Computer Supported Cooperative Work (CSCW), Nov. 14, 1998, pp. 285-294, ISBN: 978-1-58113-009-6.

Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.

Nordbotten, N. A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.

Schulzrinne, et al., "RTP: A Transport Protocol for Real-Time Applications", rfc3550.txt, Jul. 1, 2003, XP015009332, ISSN: 0000-0003.

Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.

Video Electronics Standards Association (VESA) Mobile Display Digital Interface Standard (MDDI), Jul. 2004.

Wenger et al., "RTP Payload Format for H.264 Video," Network Working Group, RFC 3984, Feb. 2005, 78 pp.

Yin Z., et al., "Third-party handshake protocol for efficient peer discovery in IEEE 802.15.3 WPANs" Broadband Networks, 2005 2ND International Conference on Boston, MA Oct. 3-7, 2005, Piscataway, NJ, USA IEEE, Oct. 3, 2005, pp. 902-911, XP010890303.

"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.

Byungjoo Lee, Provisional U.S. Appl. No. 61/433,942, filed Jan. 18, 2011.

Casner, S., et al., "Compressing IP/UDP/RTP Headers for Low-Speed Serial Links," IETF Network Working Group, RFC 2508 (Feb. 1999).

Gentric., et al., "RTP Payload Format for MPEG-4 Streams", Internet Engineering Task Force, draft-ietf-avt-mpeg4-multisl-03.txt, Nov. 2001, pp. 13,14,25 and 33.

Handley, M. et al., "SDP: Session Description Protocol" Network Working Group, Request for Comments: 2327, Category: Standards Track. ISI/LBNL, Apr. 1998, pp. 1-42.

* cited by examiner

USER INPUT DEVICE FOR WIRELESS BACK CHANNEL

This application claims priority to U.S. Provisional Application No. 61/439,809 entitled "WI-FI DISPLAY REVERSE CHANNEL SETUP AND INPUT DATA ENCAPSULATION," filed Feb. 4, 2011, and U.S. Provisional Application No. 61/579,056 entitled "USER INPUT DEVICE FOR WIRELESS BACK CHANNEL," filed Dec. 22, 2011, the entire contents of which are incorporated by reference in their entirety.

TECHNICAL FIELD

This disclosure relates to techniques for transmitting data between a wireless source device and a wireless sink device.

BACKGROUND

Wireless display (WD) or Wi-Fi Display (WFD) systems include a source device and one or more sink devices. The source device and each of the sink devices may be either mobile devices or wired devices with wireless communication capabilities. As mobile devices, for example, one or more of the source device and the sink devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its screen and audio equipment.

SUMMARY

The techniques of this disclosure generally relate to communication between a wireless source device and a wireless sink device. More specifically, this disclosure describes techniques that may enable a wireless source device to act as an input device that controls video data rendered at a wireless sink device. For example, according to aspects of this disclosure, a wireless source device may send video data to a wireless sink device for rendering and display. In addition, the wireless source device may send user input for controlling the rendered video data.

In an example, a wireless source device may include a touch display for providing user input to the wireless source device. That is, the touch display of the wireless source device may act as a touchpad or mouse pad that is similar to a touchpad on a laptop. In this example, according to aspects of this disclosure, the wireless source device may send video data to be rendered by the wireless sink device, as well as user input from the touch display. Thus, when a user provides a user input at the touch display of the wireless source device, the wireless source display may generate one or more events that correspond to the user input and send such events to the wireless sink device. In addition, according to aspects of this disclosure, the wireless source device may map the location of the user input at the wireless source device to the appropriate location at the wireless sink device.

In an example, aspects of this disclosure relate to a method that includes, in an example, sending, by a source device, display data to a sink device for rendering on the sink device. The method also includes receiving, by the source device, an indication of user input at a first display location of a touch-sensitive screen associated with the source device, wherein the user input specifies a modification of at least a portion of the display data rendered at the sink device, wherein the portion of the display data is rendered at a second display location of the sink device. The method also includes, in response to receiving the indication, sending, by the source device, second configuration data to modify the portion of the display data rendered at the second display location based at least in part on a mapping of the first display location to the second display location.

In another example, aspects of this disclosure relate to a wireless source device comprising a memory storing instructions; one or more processors configured to execute the instructions, wherein upon execution of the instructions the one or more processors cause: sending display data to a sink device for rendering on the sink device; receiving an indication of user input at a first display location of a touch-sensitive screen associated with the source device, wherein the user input specifies a modification of at least a portion of the display data rendered at the sink device, wherein the portion of the display data is rendered at a second display location of the sink device; and in response to receiving the indication, sending second configuration data to modify the portion of the display data rendered at the second display location based at least in part on a mapping of the first display location to the second display location.

In another example, aspects of this disclosure relate to a computer-readable storage medium storing instructions that upon execution by one or more processors of a wireless source device cause the one or more processors to: send display data to a sink device for rendering on the sink device; receive an indication of user input at a first display location of a touch-sensitive screen associated with the wireless source device, wherein the user input specifies a modification of at least a portion of the display data rendered at the sink device, wherein the portion of the display data is rendered at a second display location of the sink device; and in response to receiving the indication, send second configuration data to modify the portion of the display data rendered at the second display location based at least in part on a mapping of the first display location to the second display location.

In another example, aspects of this disclosure relate to a wireless source device comprising: means for sending display data to a sink device for rendering on the sink device; means for receiving an indication of user input at a first display location of a touch-sensitive screen associated with the source device, wherein the user input specifies a modification of at least a portion of the display data rendered at the sink device, wherein the portion of the display data is rendered at a second display location of the sink device; and means for sending, in response to receiving the indication, second configuration data to modify the portion of the display data rendered at the second display location based at least in part on a mapping of the first display location to the second display location.

In another example, aspects of this disclosure relate to a method comprising: receiving, by a wireless sink device, display data for rendering on the wireless sink device; receiving, by the wireless sink device, configuration data to modify a portion of the display data rendered at a first location of the wireless sink device, wherein the portion of the display data is rendered at a second display location of a wireless source device; and rendering, by the wireless sink device, the portion of the display data at the first location based at least in part on a mapping of the first display location and the second display location.

In another example, aspects of this disclosure relate to a wireless sink device comprising: a memory storing instructions; one or more processors configured to execute the instructions, wherein upon execution of the instructions the one or more processors cause: receiving, by a wireless sink device, display data for rendering on the wireless sink device; receiving, by the wireless sink device, configuration data to modify a portion of the display data rendered at a first location of the wireless sink device, wherein the portion of the display data is rendered at a second display location of a wireless source device; and rendering, by the wireless sink device, the portion of the display data at the first location based at least in part on a mapping of the first display location and the second display location.

In another example, aspects of this disclosure relate to a computer-readable storage medium storing instructions that upon execution by one or more processors of a wireless sink device cause the one or more processors to: receive display data for rendering on the wireless sink device; receive configuration data to modify a portion of the display data rendered at a first location of the wireless sink device, wherein the portion of the display data is rendered at a second display location of a wireless source device; and render the portion of the display data at the first location based at least in part on a mapping of the first display location and the second display location.

In another example, aspects of this disclosure relate to a wireless sink device comprising: means for receiving display data for rendering on the wireless sink device; means for receiving configuration data to modify a portion of the display data rendered at a first location of the wireless sink device, wherein the portion of the display data is rendered at a second display location of a wireless source device; and means for rendering the portion of the display data at the first location based at least in part on a mapping of the first display location and the second display location.

The details of one or more examples are set forth in the accompanying drawings and the description below. Other features, objects, and advantages will be apparent from the description and drawings, and from the claims.

DETAILED DESCRIPTION

Figure 1A:
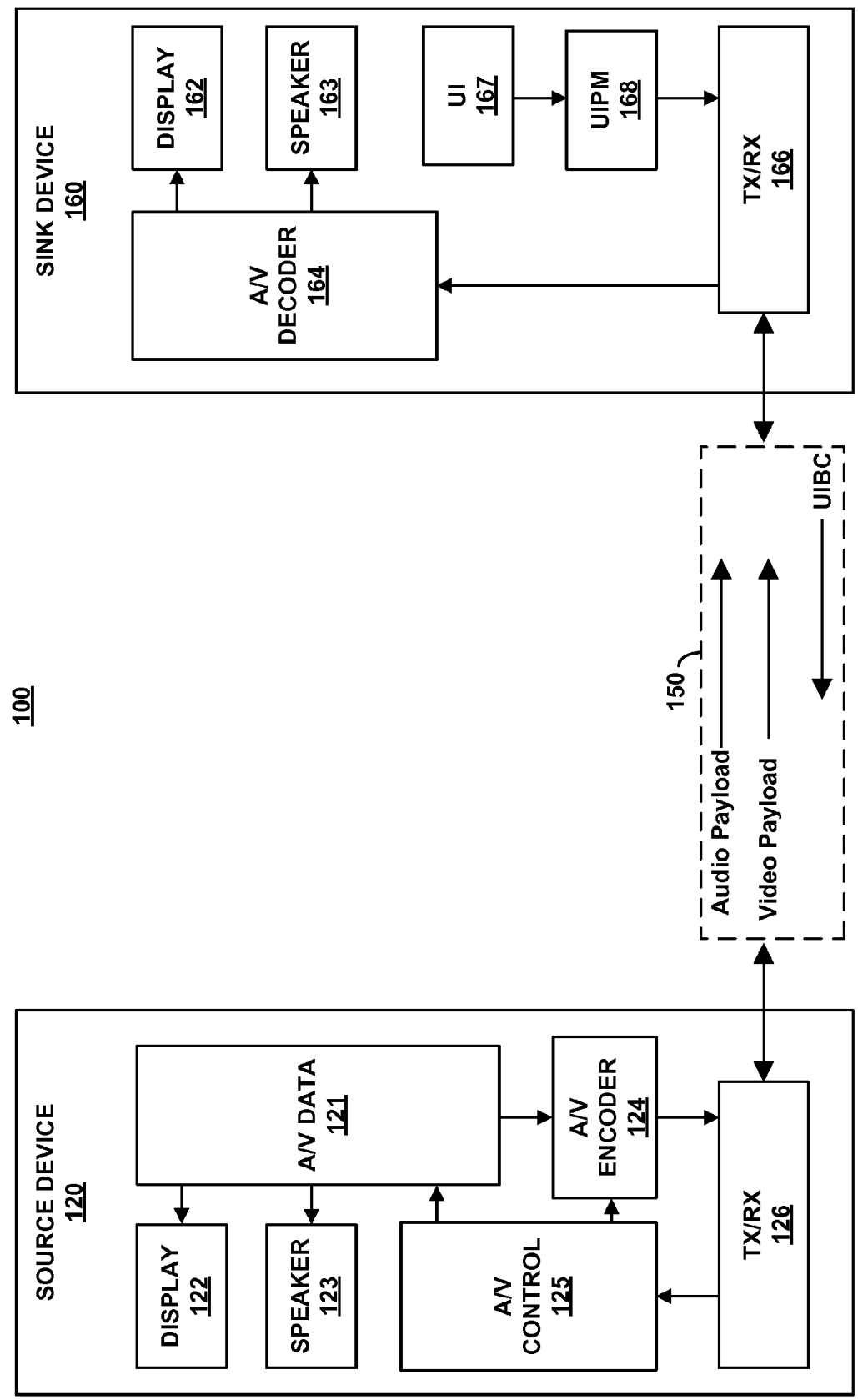
FIG. 1A is a block diagram illustrating an example of a source/sink system that may implement techniques of this disclosure.

Wireless display (WD) systems may include a wireless display (WD) source and at least one wireless display sink. Additionally, the wireless display system may include multiple wireless display sinks The wireless display source may send audio video (AV) data to a wireless display sink which may instantaneously render the received AV data at a terminal device. Audio video data, in some examples, comprises a sequence of frames (or pictures) played in rapid succession, which may also include associated audio frames, although sometimes audio frames are not included.

In some cases, the wireless display source may be prompted to respond to user inputs applied at a wireless display sink. In such an interactive application, the user inputs applied at a wireless display sink may be sent back to the wireless display source. In one example, a reverse channel architecture may be implemented to enable the wireless display system to transmit the user inputs applied at a wireless display sink to the wireless display source. The reverse channel architecture may include upper layer messages for transporting user inputs and lower layer frames for negotiating user interface capabilities at a wireless display sink and the wireless display source.

The wireless display reverse channel may reside above the Internet Protocol (IP) transport layer between a wireless display sink and the wireless display source. To promote reliable transmission and in sequence delivery to user inputs, the wireless display reverse channel may be configured run on top of TCP/IP. In some cases, there may be a mismatch between the user input interfaces at a wireless display sink and the wireless display source. To resolve the problems induced by such a mismatch and to promote a good user experience under such circumstances, user input interface capability negotiations occur between a wireless display sink and the wireless display source.

The techniques of this disclosure generally relate to communication between a wireless source device and a wireless sink device. More specifically, this disclosure describes techniques that may enable a wireless source device to act as an input device that both delivers video data to the sink device and also controls the video data rendered at a wireless sink device. For example, according to aspects of this disclosure, a wireless source device may send video data to a wireless sink device for rendering and display. In addition, the wireless source device may send user input for controlling the rendered video data.

In an example, a wireless source device may include a touch display for providing user input to the wireless source device. That is, the touch display of the wireless source device may act as a touchpad or mouse pad that is similar to a touchpad on a laptop. In this example, according to aspects of this disclosure, the wireless source device may send video data to be rendered by the wireless sink device, as well as user input from the touch display. Thus, when a user provides a user input at the touch display of the wireless source device, the wireless source display may generate one or more events that correspond to the user input and send such events to the wireless sink device. In addition, according to aspects of this disclosure, the wireless source device may map the location of the user input at the wireless source device to the appropriate location at the wireless sink device.

FIG. 1A is a block diagram illustrating an exemplary source/sink system 100 that may implement techniques of this disclosure. As shown in FIG. 1A, system 100 includes source device 120 that communicates with sink device 160 via communication channel 150. Source device 120 may include a memory that stores audio/video (A/V) data 121, display 122, speaker 123, audio/video encoder 124 (also referred to as encoder 124), audio/video control module 125, and transmitter/receiver (TX/RX) unit 126. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example, and other examples may include fewer components than those illustrated or additional components.

In the example of FIG. 1A, source device 120 can display the video portion of audio/video data 121 on display 122 and can output the audio portion of audio/video data 121 on speaker 122. Audio/video data 121 may be stored locally on source device 120, accessed from an external storage medium such as a file server, Blu-ray disc, or DVD, or may be streamed to source device 120 via a network connection such as the internet. In some instances audio/video data 121 may be captured in real-time via a camera and microphone of source device 120. Audio/video data 121 may include multimedia content such as movies, television shows, or music, but may also include real-time content generated by source device 120. Such real-time content may for example be produced by applications running on source device 120. Such real-time content may also include, in one example, a video frame of user input options available for a user to select. In some instances, audio/video data 121 may include video frames that are a combination of different types of content, such as a video frame of a movie or TV program that has user input options overlaid the frame of video.

In addition to rendering audio/video data 121 locally via display 122 and speaker 123, audio/video encoder 124 of source device 120 can encode audio/video data 121, and transmitter/receiver unit 126 can transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 12 can be simultaneously rendered by display 162 and speaker 163. The audio data and video data may be arranged in frames, and the audio frames may be time-synchronized with the video frames when rendered.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

Although, FIG. 1A shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC).

Display 122 and display 162 may comprise any of a variety of video output devices such as a cathode ray tube (CRT), a liquid crystal display (LCD), a plasma display, an organic light emitting diode (OLED) display, or another type of display device. Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 160 and sink device 120 are similar devices, e.g., both being smartphones, tablet computers, or the like. In this case, one device may operate as the source and the other may operate as the sink. These rolls may even be reversed in subsequent communication sessions.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to WiFi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a local area network, a wide-area network, or a global network such as the Internet. Source device 120 and sink device 160 may communicate over communication channel using a communications protocol such as a standard from the IEEE 802.11 family of standards.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. User input processing module 168, formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120. Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120.

Source device 120 can respond to user inputs applied at sink device 160. In such an interactive application setting, the user inputs applied at sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. To promote reliable transmission and in sequence delivery of data packets containing user input data, UIBC may be configured run on top of other packet-based communication protocols such as the transmission control protocol/internet protocol (TCP/IP) or the user datagram protocol (UDP).

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol. Generic input formats may be defined, and platform specific input formats may both be supported, thus providing flexibility in the manner in which user input can be communicated between source device 120 and sink device 160 by the UIBC.

In the example of FIG. 1A, source device 120 may comprise a smartphone, tablet computer, laptop computer, desktop computer, WiFi enabled television, or any other device capable of transmitting audio and video data. Sink device 160 may likewise comprise a smartphone, tablet computer, laptop computer, desktop computer, WiFi enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device. In many cases, source device 120 and sink device 160 may be similar or identical device, with one device operating as the source and the other operating as the sink. Moreover, these roles may be reversed in different communication sessions.

Example techniques of this disclosure may enable source device 120 to act as an input device, which may control video data rendered at sink device 160. That is, for example, source device 120 may send video data to sink device 160 for rendering and display at display 162. In this way, video data of source device 120 may be extended for display on sink device 160.

Source device 120 may also include a touch display. For instance, display 122 may be a touch display. That is, in some examples, display 122 may be a capacitive, resistive, or other type of touch panel that allows a user to provide user input to source device 120. In this way, display 122 of source device 120 may act as a touchpad or mouse pad that is similar to a touchpad on a laptop. Thus, when the user provides a user input at display 122, source device 120 may generate one or more events that correspond to the user input.

In one example, the one or more events may include parameters that further describe characteristics of the event such as the type of user input, graphical objects selected by the user input, and the like. Upon generating the event, source device 120 may send the one or more events to a sink device 160. In some examples, source device 120 may use Real-time Transport Protocol (RTP) and User Datagram Protocol (UDP) to send the event to sink device 160. In other examples, source device 120 may use Transmission Control Protocol (TCP) and Internet Protocol (IP) to send the events. In any case, sink device 160 may receive the one or more events and modify video data rendered at sink device 160 based on the events. For instance, a location or appearance of a graphical pointing object (e.g., a mouse pointer) displayed at sink device 160 may be created or modified. In other cases, source device 120 may modify display data rendered at source device 120 and data representing any modifications to the display data may be sent by source device 120 to sink device 160.

In this way, display 122 of source device 120 may be used as a mouse pad that is operable at sink device 160. Thus, in one scenario, source device 120 may be a smartphone that renders display data. The display data may be extended to sink device 160, which may be a larger display, such as an LED television. According to some aspects of this disclosure, as described in greater detail below with respect to FIG. 5, the display functionality of display 122 may be turned off to conserve power while a user's touch/finger movements may be tracked, and corresponding actions may be rendered at sink device 160. For instance, display 122 may not display any video data, while a pointer may be display at sink device 160. In some examples, source device 120, when operating as a user input device, may enable touch interactivity on sink device 160, which may have no touch sensitive display but renders display data received from source device 120. In this way, user interface capabilities may be used interchangeably between source device 120 and sink device 160.

Aspects of the present disclosure further provide techniques to map a resolution of wireless sink device 120 to a resolution of a wireless source device 160. Mapping the resolutions of the wireless devices enables events generated at source device 120 to be translated to sink device 160. For example, when source device 120 and sink device 160 initially communicate, the devices may exchange display resolution information.

Such mapping may allow a relative position on display 122 of source device to correspond to the same relative position on display 162 of sink device 160, regardless of whether display 122 is of a different resolution and/or size than display 162. For example, if a user later provides a user input at a top-left corner of display 122 of source device 120, source device 120 may generate an event. The event may specify the location of the user input on display 122 and the type of event. In response to generating the event, source device 120 may determine based on the mapping of source and sink device resolutions, a location at display 162 of sink device 160 that corresponds to the location of wireless source device's 120 display 122. Thus, if the user input is provided at the top-left corner of display 122, the input may be mapped to the top-left corner of display 162.

In some examples, source device 120 may modify the display data rendered by source device 120 based on the mapping and the user input. Data indicating the modifications may then be sent by the source device 120 to the sink device 160 to update display data rendered at the sink device 160. In an alternative example, the source device 120 may send the event to the sink device 160, and the sink device 160 may modify display data based on the event and the mapping of source and sink device resolutions.

In some instances, display 122 of source device 120 may operate as both an input device and an output device. For instance, display 122 may act as an input device using capacitive, resistive, or other coupling to determine when a user performs a touch gesture at display 122. Display 122 may also act as an output device by displaying display data using a Liquid Crystal Display (LCD) display, or other display format. In some aspects of the present disclosure, when source device 120 is used as an input device to modify display data rendered at sink device 160, source device 120 may disable the output device functionality of display 122. For example, source device 120 may disable or turn off the LCD display of the touch display to conserve power while the capacitive coupling functionality remains enabled.

In some examples, different user inputs may be received at both source device 120 and sink device 160. Consequently, when events representing the user inputs are transported from one device to another, synchronization issues may arise. For instance, display data rendered by source device 120 may be sent to sink device 160 for rendering. A user may provide a user input at sink device 160, which may generate an event that is sent to source device 120. Prior to source device 120 receiving the event, another user may provide a user input at source device 120. In such examples, timestamps may be applied to each user input to synchronize the manner in which the user inputs are applied to the display data rendered by source device 120. For instance, a first user input with an earlier timestamp may be applied prior to a second user input with a later timestamp.

In another example, a location of display data rendered by source device 120 may have changed due to a user input received at source device 120 prior to receiving an event from sink device 160. Because the event generated at sink device 160 was based on the previous location of the display data, source device 120 may evaluate the timestamp associated with the event and further identify the updated location of the display data. Based on the event, source device 120 may modify the display data using the updated location of the graphical object. In this way, techniques of the present disclosure provide for synchronization of display data across multiple devices.

Accordingly, FIG. 1A provides an example of a source/sink system 100 that may send, by a source device 120, display data to a sink device 160 for rendering on sink device 160; receive, by source device 120, an indication of user input at a first display location of a touch-sensitive screen associated with source device 120, wherein the user input specifies a modification of at least a portion of the display data rendered at sink device 160, wherein the portion of the display data is rendered at a second display location of sink device 160; and in response to receiving the indication, send, by source device 120, second configuration data to modify the portion of the display data rendered at the second display location based at least in part on a mapping of the first display location to the second display location.

Figure 1B:
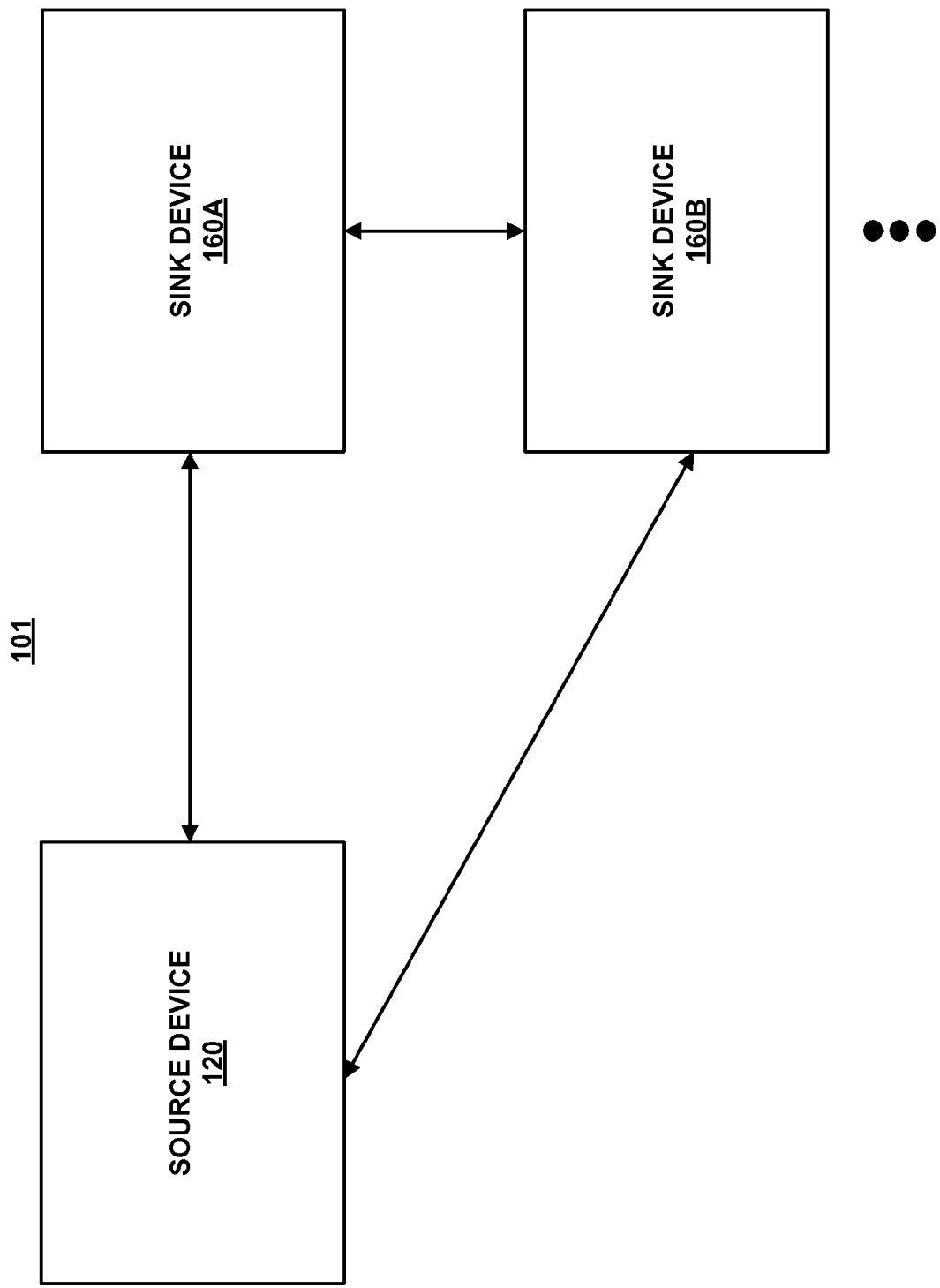
FIG. 1B is a block diagram illustrating an example of a source/sink system having two sink devices that may implement techniques of this disclosure.

FIG. 1B is a block diagram illustrating an exemplary source/sink system 101 that may implement techniques of this disclosure. Source/sink system 101 includes source device 120, sink device 160A, and sink device 160B (collectively, sink devices 160). In some examples, source device 120 and sink devices 160 may function and operate in the manner described above with respect to FIG. 1A. That is, in a similar manner as described with respect to sink device 160 shown in FIG. 1A, sink devices 160A and 160B may receive audio and video data from source device 120. For example, in some configurations, audio and video output at source device 120 may be simultaneously output at sink device 160A and sink device 160B. In addition, according to aspects of this disclosure, user input provided at source device 120 may be sent to sink device 160A and sink device 160B.

Thus, in general, it should be understood that the techniques of this disclosure may be extended to support multiple source and/or sink devices. That is, according to aspects of this disclosure, source device 120 may act as an input device, which may control video data rendered at sink devices 160A, 160B, and any other sink device that has established a connection with source device 120

Accordingly, source device 120 may perform mapping for each connected sink device 160. For example, when source device 120 initially communicates with each of the sink devices 160, the devices may exchange display resolution information. Such mapping may allow a relative position on a display of source device 120 to correspond to the same relative position on a display of each of the sink devices 160, regardless of whether the display of source device 120 is of a different resolution and/or size than the displays of sink devices 160.

In some examples, source device 120 may modify the display data rendered by source device 120 based on the mapping and the user input. Data indicating the modifications may then be sent by source device 120 to sink devices 160 to update display data rendered at the sink device 160. In an alternative example, source device 120 may send the event to sink devices 160, and sink devices 160 may modify display data based on the event and the mapping of source and sink device resolutions. Moreover, timestamps (or other manners of tracking user input) may be maintained to avoid synchronization issues, as described above with respect to FIG. 1A.

While sink device 160A and sink device 160B have been assigned like numerals, it should be understood that, in some examples, sink device 160A and sink device 160B may have different capabilities and/or perform different functions. For example, in some configurations, sink device 160A may be a primary sink device and sink device 160B may be a secondary sink device. In such a configuration, sink device 160A and sink device 160B may be coupled, and sink device 160A may display video data while sink device 160B outputs corresponding audio data.

Figure 2:
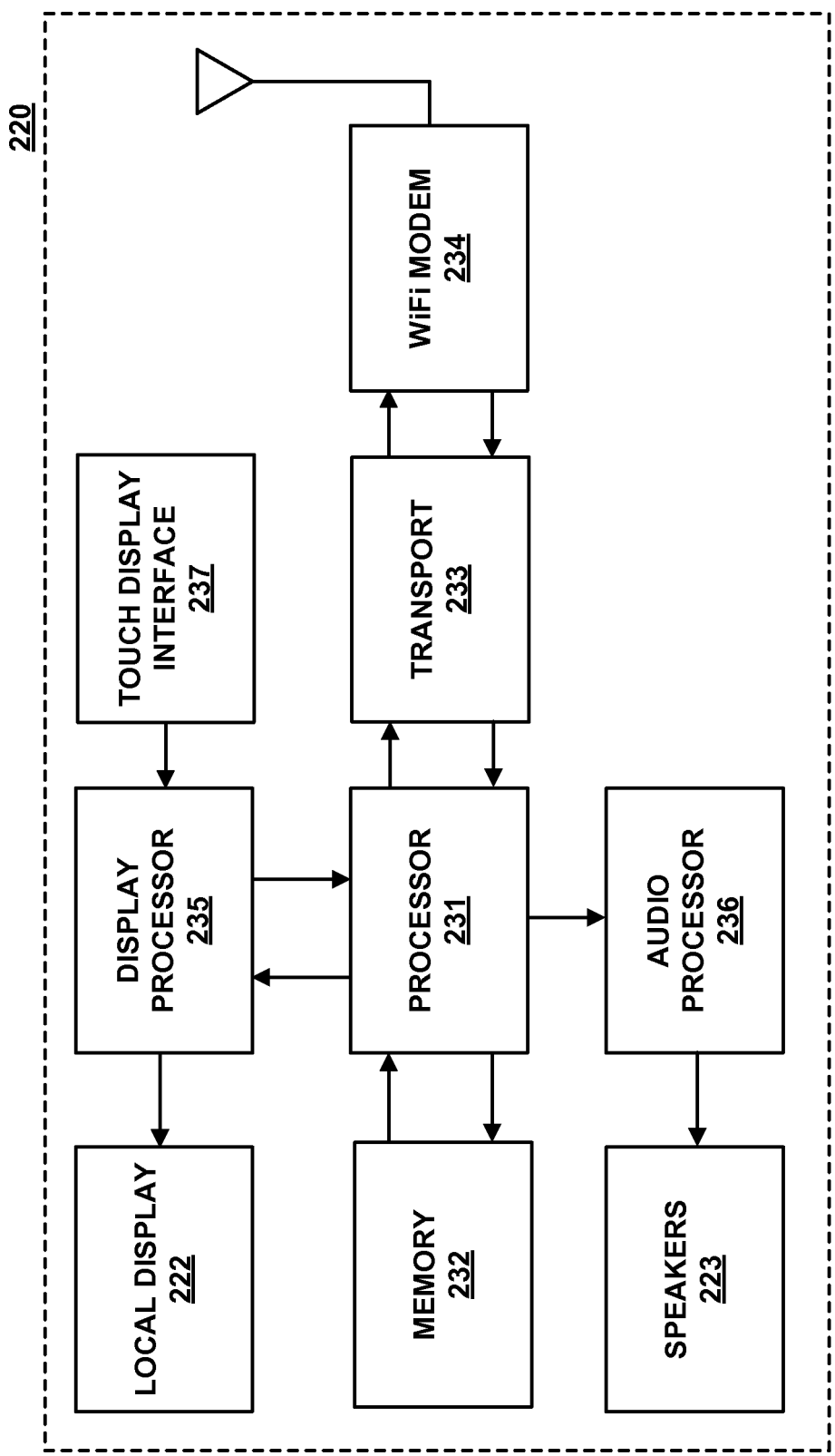
FIG. 2 is a block diagram that shows an example of a source device that may implement techniques of this disclosure.

FIG. 2 is a block diagram showing one example of a source device 220, which may carry out certain techniques of this disclosure. In some examples, source device 220 may be configured similarly to source device 120 shown and described with respect to FIG. 1A. In the example shown in FIG. 2, source device 220 includes local display 222, local speaker 223, one or more processors 231, memory 232, transport module 233, and wireless modem 234.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 232 may additionally store instructions and program code that are executed by processor 231 as part of performing the various techniques described in this disclosure.

In operation, processor 231 of source device 220 may encode and/or decode A/V data for transport, storage, and display. The A/V data may for example be stored at memory 232. Memory 232 may store an entire A/V file, or may comprise a smaller buffer that simply stores a portion of an A/V file, e.g., streamed from another device or source. Transport module 233 may process encoded A/V data for network transport. For example, encoded A/V data may be processed by multimedia processors 231 and encapsulated by transport module 233 into Network Access Layer (NAL) units for communication across a network. The NAL units may be sent by wireless modem 234 to a wireless sink device via a network connection.

Source device 220 may also locally process and display A/V data. In particular display processor 235 may process video data to be displayed on local display 222, audio processor 236 may process audio data for output on speaker 223.

In the example shown in FIG. 2, source device 220 includes touch display interface 237. In some examples, touch display interface 237 may be a capacitive, resistive, or other type of touch panel that allows a user to provide user input. For example, a user may provide one or more touch gestures to touch display interface 237, which may generate one or more events that correspond to the user input.

In one example, the one or more events may include parameters that further describe characteristics of the event such as the type of user input, graphical objects selected by the user input, and the like. Upon generating the event, source device 220 may send the one or more events to a sink device (e.g., such as sink device 160 shown in FIG. 1). That is, source device 220 may encapsulate event data, which then may be transmitted to the sink device via WiFi modem 234. In some examples, source device 220 may use Real-time Transport Protocol (RTP) and User Datagram Protocol (UDP) to send the event to the sink device. In other examples, source device 220 may use Transmission Control Protocol (TCP) and Internet Protocol (IP) to send the events.

In any case, the sink device may receive the one or more events and modify video data rendered at the sink device based on the events. For instance, a location or appearance of a graphical pointing object (e.g., a mouse pointer) displayed at the sink device may be created or modified. In other cases, source device 220 may modify display data rendered at source device 220 and data representing any modifications to the display data may be sent by source device 220 to the sink device.

As described above with reference to source device 120 of FIG. 1A, source device 220 may also receive user input commands from a sink device. In this manner, wireless modem 234 of source device 220 receives encapsulated data packets, such as NAL units, and sends the encapsulated data units to transport unit 233 for decapsulation. For instance, transport unit 233 may extract data packets from the NAL units, and processor 231 can parse the data packets to extract the user input commands. Based on the user input commands, processor 231 can adjust the encoded A/V data being transmitted by source device 220 to a sink device.

Figure 3:
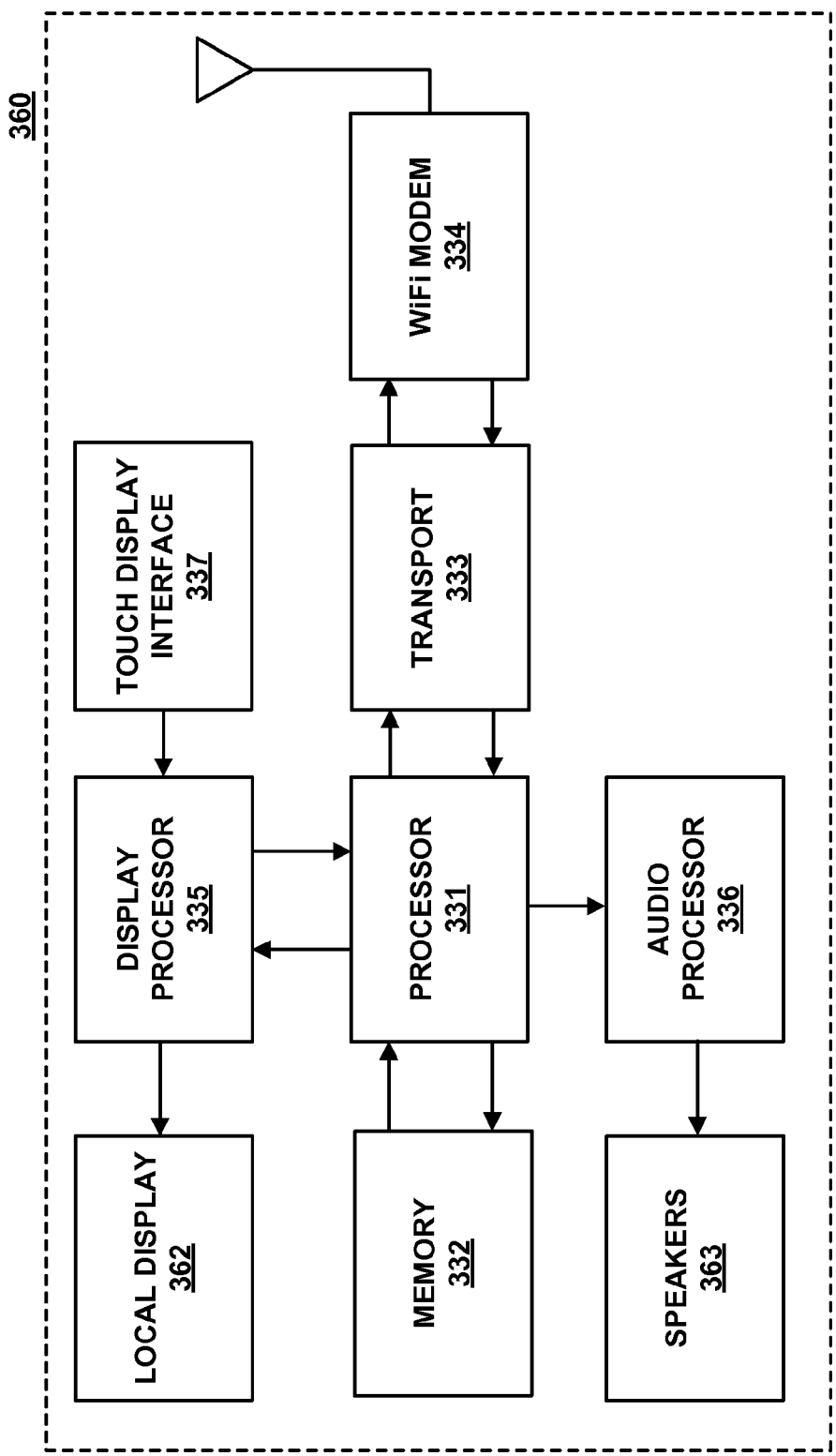
FIG. 3 is a block diagram that shows an example of a sink device that may implement techniques of this disclosure.

FIG. 3 shows an example of a sink device 360, which may carry out certain techniques of this disclosure. In some examples, sink device 360 may be configured similarly to sink device 160 shown and described with respect to FIG. 1A. In the example shown in FIG. 3, sink device 360 includes one or more processors 331, memory 332, transport unit 333, wireless modem 334, display processor 335, local display 362, audio processor 336, speaker 363, and touch display interface 337.

Processor 331 of FIG. 3 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 332 may additionally store instructions and program code that are executed by processor 331 as part of performing the various techniques described in this disclosure.

According to aspects of this disclosure, sink device 360 may receive, at wireless modem 334, encapsulated data units sent from a source device (e.g., such as source device 120 (FIG. 1A) or source device 220 (FIG. 2)). Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, wireless sink device 360 can also receive user input through touch display interface 337. Although the example of FIG. 3 utilizes a touch display interface as an example input device, other input devices such as keyboards, mouse, or voice command modules are all compatible with the techniques of this disclosure. User input received through touch display interface 337 can be processed by processor 331. This processing may include generating data packets that included the received user input command in accordance with the techniques described in this disclosure. Once generated, transport module 333 may process the data packets for network transport to a wireless source device over a UIBC.

Figure 4:
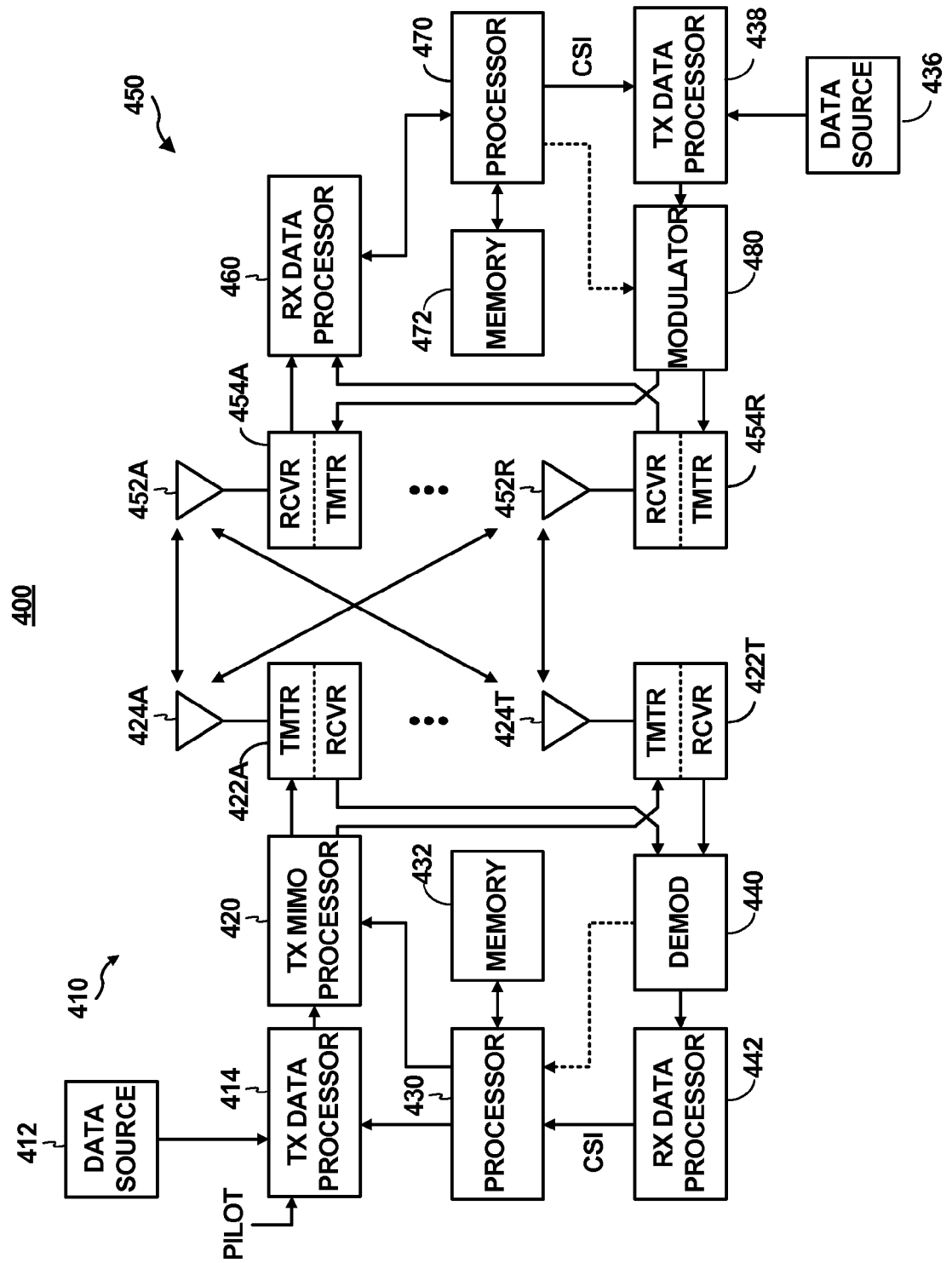
FIG. 4 is a block diagram that shows an example of a transmitter system and a receiver system that may implement techniques of this disclosure.

FIG. 4 shows a block diagram of an example transmitter system 410 and receiver system 450, which may be used by transmitter/receiver 126 and transmitter/receiver 166 of FIG. 1A for communicating over communication channel 150. At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provides NT modulation symbol streams to NT transmitters (TMTR) 422a through 422t. In certain aspects, TX MIMO processor 420 applies beamforming weights to the symbols of the data streams and to the antenna from which the symbol is being transmitted.

Each transmitter 422 may receive and process a respective symbol stream to provide one or more analog signals, and further conditions (e.g., amplifies, filters, and upconverts) the analog signals to provide a modulated signal suitable for transmission over the MIMO channel. NT modulated signals from transmitters 422a through 422t are then transmitted from NT antennas 424a through 424t, respectively.

At receiver system 450, the transmitted modulated signals are received by NR antennas 452a through 452r and the received signal from each antenna 452 is provided to a respective receiver (RCVR) 454a through 454r. Receiver 454 conditions (e.g., filters, amplifies, and downconverts) a respective received signal, digitizes the conditioned signal to provide samples, and further processes the samples to provide a corresponding "received" symbol stream.

A receive (RX) data processor 460 then receives and processes the NR received symbol streams from NR receivers 454 based on a particular receiver processing technique to provide NT "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

Figure 5:
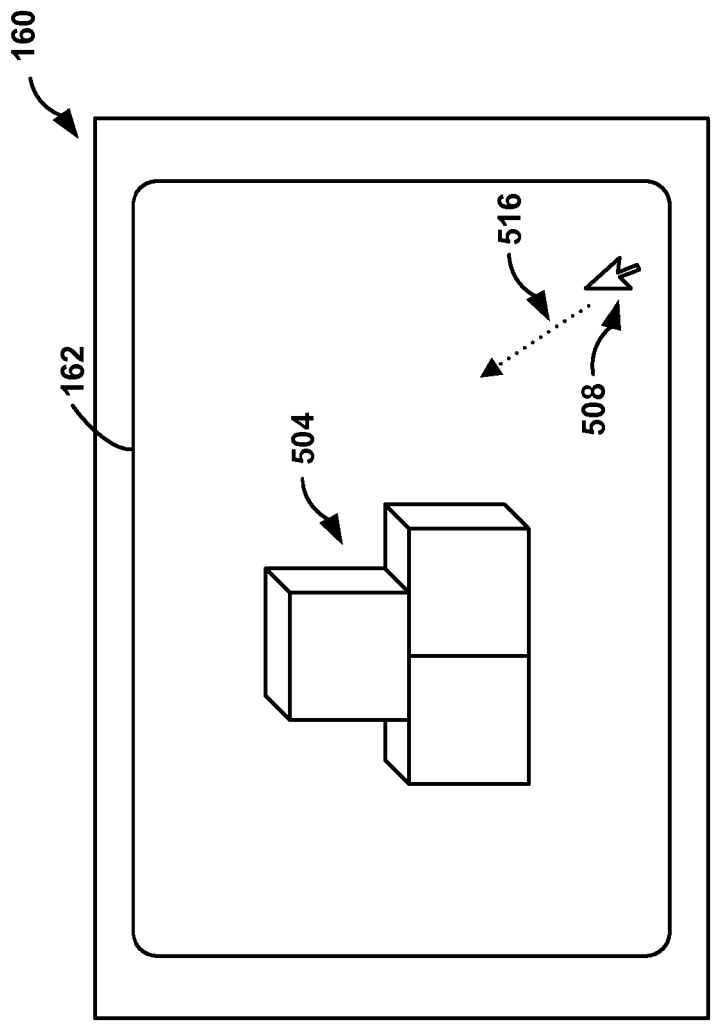
FIG. 5 is a conceptual diagram of a sink device and a source device that may implement techniques of this disclosure.
Figure 5:
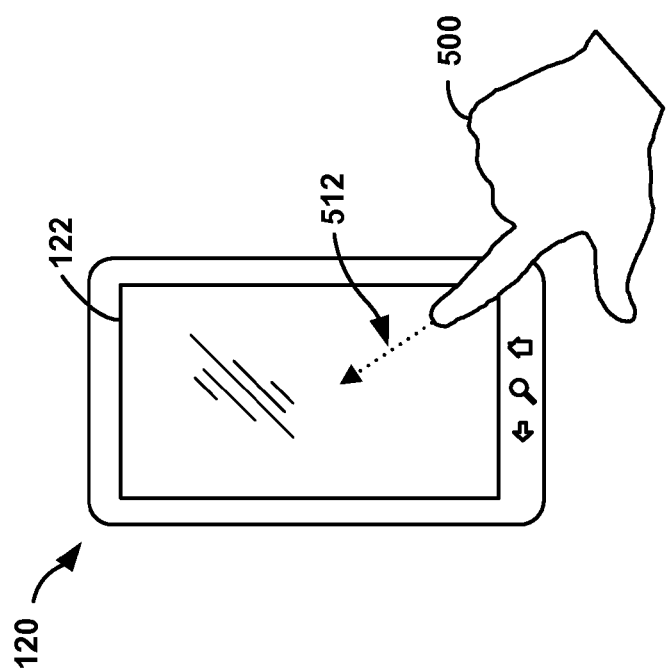

FIG. 5 is a conceptual diagram of a sink device and a source device that may implement techniques of this disclosure. While FIG. 5 is described with respect to source device 120 and sink device 160 (FIG. 1A), it should be understood that the techniques of FIG. 5 may be performed by a variety of devices, including other source and sink devices.

In the example shown in FIG. 5, display 122 of source device 120 is configured as a touch sensitive display. That is, for example, display 122 may be a capacitive, resistive, or other type of touch panel that allows a user to provide user input to source device 120. Thus, when a user 500 provides a user input at display 122, source device 120 may generate one or more events that correspond to the user input. In some examples, such user input may be referred to as a "touch gesture." Touch gestures may correspond to user 500 making contact with display 122 at one or more points. That is, display 122 may be designed to simultaneously recognize touches at more than one point, a feature commonly referred to as "multi-touch." Multi-touch displays may separately identify and interpret touches in different areas of the screen. Accordingly, simultaneously touching display 122 in more than one location may provide a user with additional ways to interact with source device 120 (e.g., versus a single touch)

As noted above, example techniques of this disclosure may enable source device 120 to act as an input device, which may control video data rendered at sink device 160. For example, source device 120 may send video data to sink device 160 for rendering and display at display 162 (shown in FIG. 5 as a series of cubes 504). In this way, video data of source device 120 may be extended for display on sink device 160.

In addition, according to aspects of this disclosure, source device 120 may send one or more events to sink device 160. For example, the one or more events may include parameters that further describe characteristics of the event, such as the type of user input (e.g., a type of touch gesture), graphical objects selected by the user input, and the like. In some examples, source device 120 may use Real-time Transport Protocol (RTP) and User Datagram Protocol (UDP) to send events to sink device 160. In other examples, source device 120 may use Transmission Control Protocol (TCP) and Internet Protocol (IP) to send events to sink device 160.

In any case, sink device 160 may receive the one or more events and modify video data rendered at sink device 160 based on the events. In one example, a location or appearance of a graphical pointing object (e.g., a mouse pointer) 508 displayed at sink device 160 may be created or modified. In other examples, source device 120 may modify display data rendered at source device 120 and data representing any modifications to the display data may be sent by source device 120 to sink device 160.

In this way, display 122 of source device 120 may be used as a mouse pad that is operable at sink device 160. Thus, in one scenario, source device 120 may be a smartphone that renders display data. The display data may be extended to sink device 160, which may be a larger display, such as an LED television.

According to some aspects of this disclosure, the display functionality of display 122 may be turned off to conserve power while a user's touch/finger movements may be tracked, and corresponding actions may be rendered at sink device 160. In the example shown in FIG. 5, user 500 may provide a touch input from a lower left corner of display 122 to the relative center of display 122 (e.g., a swiping touch gesture during which user 500 maintains contact with display 122), as indicated by dashed line 512. In this example, graphical pointing object 508 displayed on display 162 of sink device 160 may move from a lower left corner of display 162 to the center of display 162, following a path 516 substantially similar to the input provided at source device 120. In addition, according to aspects of this disclosure, graphical pointing object 508 may not be displayed on display 122 of source device 120, but may be displayed on display 162 of sink device 160.

Aspects of the present disclosure further provide techniques to map a resolution of wireless sink device 120 to a resolution of a wireless source device 160. Mapping the resolutions of the wireless devices enables events generated at source device 120 to be translated to sink device 160. For example, when source device 120 and sink device 160 initially communicate, the devices may exchange display resolution information.

Such mapping may allow a relative position on display 122 of source device to correspond to the same relative position on display 162 of sink device 160, regardless of whether display 122 is of a different resolution and/or size than display 162. That is, as noted above, if user 500 provides a touch input in a lower left corner of display 122 of source device 120, the input may also be provided in the lower left corner of display 162 of sink device 160. In addition, if user provides a swiping gesture at display 122 toward the relative center of display 122 (as indicated by dashed line 512), a swiping gesture may be carried out on sink device 160 toward center of display 162. The resolutions of source device 120 and sink device 160 may be mapped such that when user 500 reaches the relative center of display 122, graphical pointing object 508 also reaches the relative center of display 162, despite display 122 having a different resolution than display 162.

In some examples, source device 120 may modify the display data rendered by source device 120 based on the mapping and the user input. Data indicating the modifications may then be sent by the source device 120 to the sink device 160 to update display data rendered at the sink device 160. In an alternative example, the source device 120 may send the event to the sink device 160, and the sink device 160 may modify display data based on the event and the mapping of source and sink device resolutions.

Figure 6:
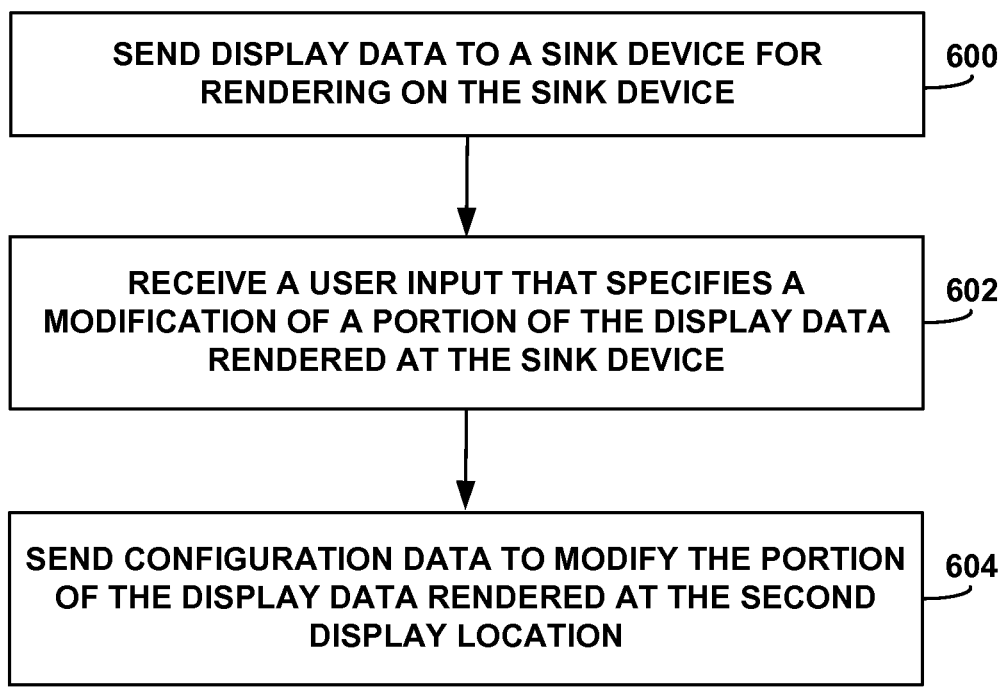
FIG. 6 shows a flow diagram illustrating an example method that may enable a wireless source device to act as an input device for data rendered at a wireless sink device.

FIG. 6 is a flow diagram illustrating an example method that may enable a wireless source device to act as an input device. That is, according to the example shown in FIG. 6, a source device may control video data rendered at a wireless sink device. While the method shown in FIG. 6 may be described with respect to source device 120 and sink device 160 for purposes of explanation, it should be understood that the method of FIG. 6 may be performed by a variety of devices, including other source and/or sink devices.

As shown in FIG. 6, source device 120 may initially send display data to sink device 160 for rendering on sink device 160 (600). Display data may include, for example, a sequence of frames (or pictures) played in rapid succession to simulate the rendition of full-motion video. In some examples, source device 120 may encode the display data prior to sending the display data to sink device 160. In response to receiving the display data, sink device 160 may render the display data. For instance, sink device 160 may decode the display data and further cause display 162 to display visual representations of the display data.

In accordance with techniques of the present disclosure that enable a wireless source device to act as an input device, source device 120 may receive an indication of user input at a first display location of a touch-sensitive screen associated with source device 120 (602). For example, an indication of a user input may include the user performing a gesture at the first display location of the touch-sensitive screen, the gesture being detectable by source device 120.

The user input may specify a modification of at least a portion of the display data rendered at sink device 160. For example, a user may move a graphical pointing object from one location on display 162 to another location on display 162. In another example, a user may select a graphical object on display 162. The portion of the display data rendered at sink device 160 may be rendered at a second display location of sink device 160.

Source device 120 may, in some examples, send second configuration data to modify the portion of the display data rendered at the second display location of sink device 160, in response to receiving the indication of user input (604). In some examples, the second configuration data may be based at least in part on a mapping of the first display location to the second display location. For instance, the mapping may be a mapping of a first display resolution associated with display 122 of source device 120 to a second display resolution of display 162 of sink device 160.

Figure 7:
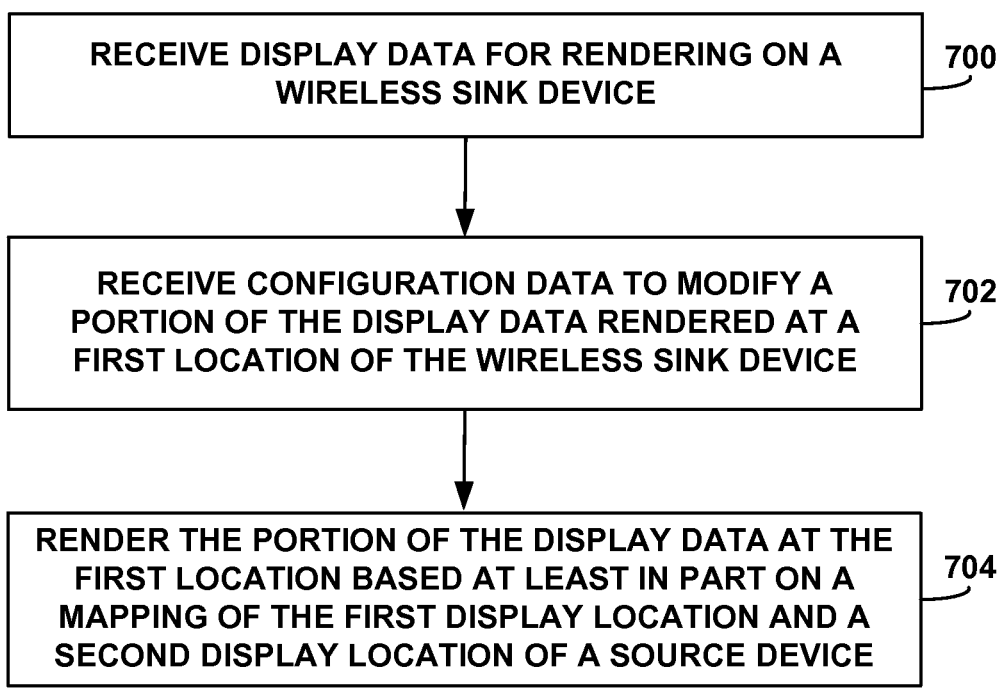
FIG. 7 shows a flow diagram illustrating an example method that may enable a wireless sink device to render display data based on user input from a wireless source device.

FIG. 7 shows a flow diagram illustrating an example method that may enable a wireless sink device to render display data based on user input from a wireless source device. While the method shown in FIG. 7 may be described with respect to source device 120 and sink device 160 for purposes of explanation, it should be understood that the method of FIG. 7 may be performed by a variety of devices, including other source and/or sink devices.

As shown in FIG. 7, sink device 160 may receive display data from source device 120 for rendering on sink device 160 (700). Display data may include, for example, a sequence of frames (or pictures) played in rapid succession to simulate the rendition of full-motion video. In some examples, sink device 160 may receive encoded display data from source device 120. Accordingly, sink device 160 may decode the display data and further cause display 162 to display visual representations of the display data.

According to aspects of this disclosure, sink device 160 may also receive configuration data to modify a portion of the display data rendered at a first location of sink device 160 (702). The portion of the display data may correspond to data rendered at a second display location of source device 120. That is, according to aspects of this disclosure, sink device 160 may render the portion of the display data at the first location based at least in part on a mapping of the first display location at sink device 160 from the second display location at source device 120 (704).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   sending, by a source device, display data to a sink device for rendering on the sink device;
   receiving, by the source device, an indication of user input at a first display location of a touch-sensitive screen associated with the source device, wherein the user input specifies a modification of at least a portion of the display data rendered at the sink device, wherein the at least a portion of the display data to be modified is rendered at a second display location of the sink device; and
   in response to receiving the indication, sending, by the source device, configuration data to modify the at least a portion of the display data rendered at the second display location based at least in part on a mapping of the first display location to the second display location.

2. The method of claim 1, wherein the mapping is further based at least in part on a mapping of a first display resolution associated with the touch-sensitive display to a second display resolution of the sink device.

3. The method of claim 1, further comprising:
   receiving, at the touch sensitive screen of the source device, a second indication of user input;
   in response to receiving the second indication, generating, by the source device, a first event based at least in part on the second indication that is associated with a first timestamp;
   receiving, by the source device and from the sink device, a second event that is associated with a second timestamp;
   determining, by the source device, whether the second timestamp represents an earlier time than the first timestamp; and
   when the second timestamp represents the earlier time than the first timestamp, modifying the display data based at least in part on the second event before modifying the display data based at least in part on the first event.

4. The method of claim 1, further comprising, in response to receiving a second indication of user input, refraining from displaying, by the source device, the display data.

5. The method of claim 1, wherein the at least a portion of the display data rendered at the second display location comprises a graphical pointing object.

6. A wireless source device comprising:
   a memory storing instructions;
   one or more processors configured to execute the instructions, wherein upon execution of the instructions the one or more processors cause:
   sending display data to a sink device for rendering on the sink device;
   receiving an indication of user input at a first display location of a touch-sensitive screen associated with the source device, wherein the user input specifies a modification of at least a portion of the display data rendered at the sink device, wherein the at least a portion of the display data to be modified is rendered at a second display location of the sink device; and
   in response to receiving the indication, sending configuration data to modify the at least a portion of the display data rendered at the second display location based at least in part on a mapping of the first display location to the second display location.

7. The wireless source device of claim 6, wherein the mapping is further based at least in part on a mapping of a first display resolution associated with the touch-sensitive display to a second display resolution of the sink device.

8. The wireless source device of claim 6, wherein upon execution of the instructions the one or more processors further cause:
receiving, at the touch sensitive screen of the source device, a second indication of user input;
in response to receiving the second indication, generating a first event based at least in part on the second indication that is associated with a first timestamp;
receiving, from the sink device, a second event that is associated with a second timestamp;
determining whether the second timestamp represents an earlier time than the first timestamp; and
when the second timestamp represents the earlier time than the first timestamp, modifying the display data based at least in part on the second event before modifying the display data based at least in part on the first event.

9. The wireless source device of claim 6, wherein upon execution of the instructions the one or more processors further cause:
in response to receiving a second indication of user input, refraining from displaying, by the source device, the display data.

10. The wireless source device of claim 6, wherein the at least a portion of the display data rendered at the second display location comprises a graphical pointing object.

11. A non-transitory computer-readable storage medium storing instructions that upon execution by one or more processors of a wireless source device cause the one or more processors to:
send display data to a sink device for rendering on the sink device;
receive an indication of user input at a first display location of a touch-sensitive screen associated with the wireless source device, wherein the user input specifies a modification of at least a portion of the display data rendered at the sink device, wherein the at least a portion of the display data to be modified is rendered at a second display location of the sink device; and
in response to receiving the indication, send configuration data to modify the at least a portion of the display data rendered at the second display location based at least in part on a mapping of the first display location to the second display location.

12. The non-transitory computer readable storage medium of claim 11, wherein the mapping is further based at least in part on a mapping of a first display resolution associated with the touch-sensitive display to a second display resolution of the sink device.

13. The non-transitory computer readable storage medium of claim 11, storing instructions that upon execution by one or more processors of the wireless source device further cause the one or more processors to:
receive, at the touch sensitive screen of the wireless source device, a second indication of user input;
in response to receiving the second indication, generate, by the wireless source device, a first event based at least in part on the second indication that is associated with a first timestamp;
receive, by the wireless source device and from the sink device, a second event that is associated with a second timestamp;
determine, by the wireless source device, whether the second timestamp represents an earlier time than the first timestamp; and
when the second timestamp represents the earlier time than the first timestamp, modify the display data based at least in part on the second event before modifying the display data based at least in part on the first event.

14. The non-transitory computer readable storage medium of claim 11, storing instructions that upon execution by one or more processors of the wireless source device further cause the one or more processors to, in response to receiving a second indication of user input, refrain from displaying, by the wireless source device, the display data.

15. The non-transitory computer readable storage medium of claim 11, wherein the at least a portion of the display data rendered at the second display location comprises a graphical pointing object.

16. A wireless source device comprising:
means for sending display data to a sink device for rendering on the sink device;
means for receiving an indication of user input at a first display location of a touch-sensitive screen associated with the source device, wherein the user input specifies a modification of at least a portion of the display data rendered at the sink device, wherein the at least a portion of the display data to be modified is rendered at a second display location of the sink device; and
means for sending, in response to receiving the indication, configuration data to modify the at least a portion of the display data rendered at the second display location based at least in part on a mapping of the first display location to the second display location.

17. The wireless source device of claim 16, wherein the mapping is further based at least in part on a mapping of a first display resolution associated with the touch-sensitive display to a second display resolution of the sink device.

18. The wireless source device of claim 16, further comprising:
means for receiving, at the touch sensitive screen of the source device, a second indication of user input;
means for generating, in response to receiving the second indication, a first event based at least in part on the second indication that is associated with a first timestamp;
means for receiving from the sink device, a second event that is associated with a second timestamp;
means for determining whether the second timestamp represents an earlier time than the first timestamp; and
means for modifying the display data, when the second timestamp represents the earlier time than the first timestamp, based at least in part on the second event before modifying the display data based at least in part on the first event.

19. The wireless source device of claim 16, further comprising:
means for refraining from displaying, in response to receiving a second indication of user input, the display data.

20. The wireless source device of claim 16, wherein the at least a portion of the display data rendered at the second display location comprises a graphical pointing object.

21. A method comprising:
receiving, by a wireless sink device, display data for rendering on the wireless sink device;
receiving, by the wireless sink device, configuration data to modify a portion of the display data rendered at a first location of the wireless sink device, wherein the portion of the display data to be modified is rendered at a second display location of a wireless source device; and rendering, by the wireless sink device, the portion of the display data at the first location based at least in part on a mapping of the first display location and the second display location.

22. The method of claim 21, further comprising:
sending, by the wireless sink device, a display resolution of the wireless sink device to the wireless source device.

23. The method of claim 21, further comprising:
receiving, at a touch-sensitive screen of the wireless sink device, an indication of user input;
in response to receiving the indication, generating, by the wireless sink device, an event associated with a timestamp that indicates at least a time when the indication of user input was received; and
sending, by the wireless sink device and to the wireless source device, the event.

24. The method of claim 21, wherein the portion of the display data rendered at the first location comprises a graphical pointing object.

25. A wireless sink device comprising:
a memory storing instructions;
one or more processors configured to execute the instructions, wherein upon execution of the instructions the one or more processors cause:
receiving, by a wireless sink device, display data for rendering on the wireless sink device;
receiving, by the wireless sink device, configuration data to modify a portion of the display data rendered at a first location of the wireless sink device, wherein the portion of the display data to be modified is rendered at a second display location of a wireless source device; and
rendering, by the wireless sink device, the portion of the display data at the first location based at least in part on a mapping of the first display location and the second display location.

26. The wireless sink device of claim 25, wherein upon execution of the instructions the one or more processors further cause:
sending a display resolution of the wireless sink device to the wireless source device.

27. The wireless sink device of claim 25, wherein upon execution of the instructions the one or more processors further cause:
receiving, at a touch-sensitive screen of the wireless sink device, an indication of user input;
in response to receiving the indication, generating an event associated with a timestamp that indicates at least a time when the indication of user input was received; and
sending, to the wireless source device, the event.

28. The wireless sink device of claim 25, wherein the portion of the display data rendered at the first location comprises a graphical pointing object.

29. A non-transitory computer-readable storage medium storing instructions that upon execution by one or more processors of a wireless sink device cause the one or more processors to:
receive display data for rendering on the wireless sink device;
receive configuration data to modify a portion of the display data rendered at a first location of the wireless sink device, wherein the portion of the display data to be modified is rendered at a second display location of a wireless source device; and
render the portion of the display data at the first location based at least in part on a mapping of the first display location and the second display location.

30. The non-transitory computer readable storage medium of claim 29, storing instructions that upon execution by one or more processors of the sink device further cause the one or more processors to:
send a display resolution of the wireless sink device to the wireless source device.

31. The non-transitory computer readable storage medium of claim 29, storing instructions that upon execution by one or more processors of the sink device further cause the one or more processors to:
receive, at a touch-sensitive screen of the wireless sink device, an indication of user input;
in response to receiving the indication, generate an event associated with a timestamp that indicates at least a time when the indication of user input was received; and
send, to the wireless source device, the event.

32. The non-transitory computer readable storage medium of claim 29, wherein the portion of the display data rendered at the first location comprises a graphical pointing object.

33. A wireless sink device comprising:
means for receiving display data for rendering on the wireless sink device;
means for receiving configuration data to modify a portion of the display data rendered at a first location of the wireless sink device, wherein the portion of the display data to be modified is rendered at a second display location of a wireless source device; and
means for rendering the portion of the display data at the first location based at least in part on a mapping of the first display location and the second display location.

34. The wireless sink device of claim 33, further comprising:
means for sending a display resolution of the wireless sink device to the wireless source device.

35. The wireless sink device of claim 33, further comprising:
means for receiving an indication of user input;
means for generating, in response to receiving the indication, an event associated with a timestamp that indicates at least a time when the indication of user input was received; and
means for sending, to the wireless source device, the event.

36. The wireless sink device of claim 33, wherein the portion of the display data rendered at the first location comprises a graphical pointing object.

* * * * *